United States Patent
Joshi (10) Patent No.: US 12,244,828 B2
(45) Date of Patent: Mar. 4, 2025

(54) IMAGE PROCESSING SYSTEMS AND METHODS

(71) Applicant: Canva Pty Ltd, Surry Hills (AU)

(72) Inventor: Bhautik Jitendra Joshi, Lewisham (AU)

(73) Assignee: CANVA PTY LTD, Surry Hills (AU)

( * ) Notice: Subject to any disclaimer, the term of this patent is extended or adjusted under 35 U.S.C. 154(b) by 0 days.

(21) Appl. No.: 17/943,180

(22) Filed: Sep. 12, 2022

(65) Prior Publication Data

US 2023/0092409 A1 Mar. 23, 2023

(30) Foreign Application Priority Data

Sep. 17, 2021 (AU) ................................ 2021232830

(51) Int. Cl.
 *H04N 19/182* (2014.01)
 *G06T 5/00* (2024.01)
 *H04N 9/64* (2023.01)

(52) U.S. Cl.
 CPC ............. *H04N 19/182* (2014.11); *G06T 5/00* (2013.01); *H04N 9/646* (2013.01)

(58) Field of Classification Search
 CPC ....... H04N 19/182; H04N 9/646; G06T 5/001
 See application file for complete search history.

(56) References Cited

U.S. PATENT DOCUMENTS

| | | | | |
|---|---|---|---|---|
| 2011/0050864 A1* | 3/2011 | Bond | ................... | H04N 13/261 348/42 |
| 2013/0094776 A1* | 4/2013 | Lainema | ................ | H04N 19/61 382/233 |
| 2017/0223250 A1* | 8/2017 | Ajito | .................... | H04N 25/134 |

FOREIGN PATENT DOCUMENTS

WO   WO-2019008519 A1 * 1/2019   ........... G06K 9/6202

OTHER PUBLICATIONS

Australian Examination Report for application No. 2021232830 mailed Sep. 8, 2022.
Extended European Search Report for EP22195542 mailed Feb. 3, 2023 (Entire document, pp. 1-9).

(Continued)

*Primary Examiner* — Wednel Cadeau
(74) *Attorney, Agent, or Firm* — GrowIP Law Group LLC (57) ABSTRACT

Described herein is a computer implemented method. The method includes accessing input image data defining a plurality of input pixels and processing the input image data to generate output image data. The output image data defines a plurality of output pixels, each corresponding to an input pixel. At least one output pixel is generated by a sampling process that includes: selecting a working pixel from the plurality of input pixels; selecting a set of sample pixels for the working pixel, wherein each sample pixel is an input pixel that is selected as a sample pixel based on whether the input pixel is positioned within a depth-adjusted sampling area, the depth-adjusted sampling area for a particular input pixel being determined based on a depth separation between that particular input pixel and the working pixel; and generating an output pixel corresponding to the working pixel based on the set of sample pixels.

20 Claims, 7 Drawing Sheets

(56) References Cited

OTHER PUBLICATIONS

McIntosh Let Al: "Efficiently Simulating the Bokeh of Polygonal Apertures in a Post-Process Depth of Field Shader", Computer Graphics Forum : Journal of the European Association for Computer Graphics, Wiley-Blackwell, Oxford, vol. 31, No. 6, Mar. 5, 2012 (Mar. 5, 2012), pp. 1810-1822, XP071487777, ISSN: 0167-7055, DOI: 10.1111 /J.1467-8659.2012.02097.X.
Yu Kai et al: "Permission Layered Depth-of-Field Rendering Using Color Spreading", Nov. 17, 2013 (Nov. 17, 2013), pp. 77-82, XP93015850, Retrieved from the Internet: URL:https://dl.acm.org/doi/pdf/10.1145/2534329.2534340 [retrieved on Jan. 19, 2023].
Barsky et al.: Algorithms for Rendering Depth of Field Effects in Computer Graphics, Jan. 2008, available at https://www.researchgate.net/publication/228819904_Algorithms_for_rendering_depth_of_field_effects_in_computer_graphics.

* cited by examiner

IMAGE PROCESSING SYSTEMS AND METHODS

CROSS-REFERENCE TO RELATED APPLICATION

This application is a U.S. Non-Provisional Application that claims priority to Australian Patent Application No. 2021232830, filed Sep. 17, 2021, which is hereby incorporated by reference in its entirety.

TECHNICAL FIELD

Aspects of the present disclosure are directed to image processing systems and methods.

BACKGROUND

Image capture devices are almost ubiquitous. In addition to dedicated cameras, most (if not all) smart phone devices include cameras. Many images are originally captured in a digital format, and even where images are initially captured on film they are often scanned into a digital format. As a result, the number of digital images that are processed has become massive.

Digital images can be processed in a huge variety of ways. Such processing is often performed in order to try and improve the appearance of an image by applying one or more image effects.

In many cases, applying an image effect to a digital image involves pixel-level processing. With even smartphones now providing a capture resolution of (for example) 4032×3024 pixels (i.e. 12 million pixels), developing digital effects and applying digital effects to digital images can be challenging.

SUMMARY

Described herein is a computer implemented method including: accessing input image data defining a plurality of input pixels; and processing the input image data to generate output image data, the output image data defining a plurality of output pixels, wherein each output pixel corresponds to an input pixel and at least one output pixel is generated by a sampling process that includes: selecting a working pixel from the plurality of input pixels; selecting a set of sample pixels for the working pixel, wherein each sample pixel in the set of sample pixels is an input pixel that is selected as a sample pixel based on whether the input pixel is positioned within a depth-adjusted sampling area, the depth-adjusted sampling area for a particular input pixel being determined based on a depth separation between that particular input pixel and the working pixel; and generating an output pixel that corresponds to the working pixel based on the set of sample pixels.

While the description is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION

In the following description numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

The present disclosure is generally concerned with digital image processing. To illustrate the features of the present disclosure, the embodiments described below will focus on digital image processing to simulate a depth of field effect. The techniques described herein may, however, be used (or be adapted to be used) in other kernel-based image processing techniques, for example image de-noising, image filter effects, and/or other image processing techniques.

There are many situations where photographers (or users of images captured by others) want images to have a depth of field effect. Generally speaking, a depth of field effect involves one area of an image (typically the subject) being in sharp (or relatively sharp) focus and the rest of the image being blurred (or relatively blurred).

In traditional cameras, a depth of field effect can be optically created at the time of capturing an image based (generally speaking) on the aperture of the lens and the distances between the camera and the objects in the scene. Not all cameras, however, have lenses that are capable of capturing images with desired depth of field effects—and even where cameras/lenses are capable of doing so, there may be a desire to simulate a depth of field effect in post-processing rather than have the effect originally captured and permanent in the image pixels.

The particular embodiments described below are concerned with processing digital images to simulate a depth of field effect. As noted, however, the techniques described may be used (or be adapted to be used) in other kernel-based image processing systems and methods.

Figure 1:
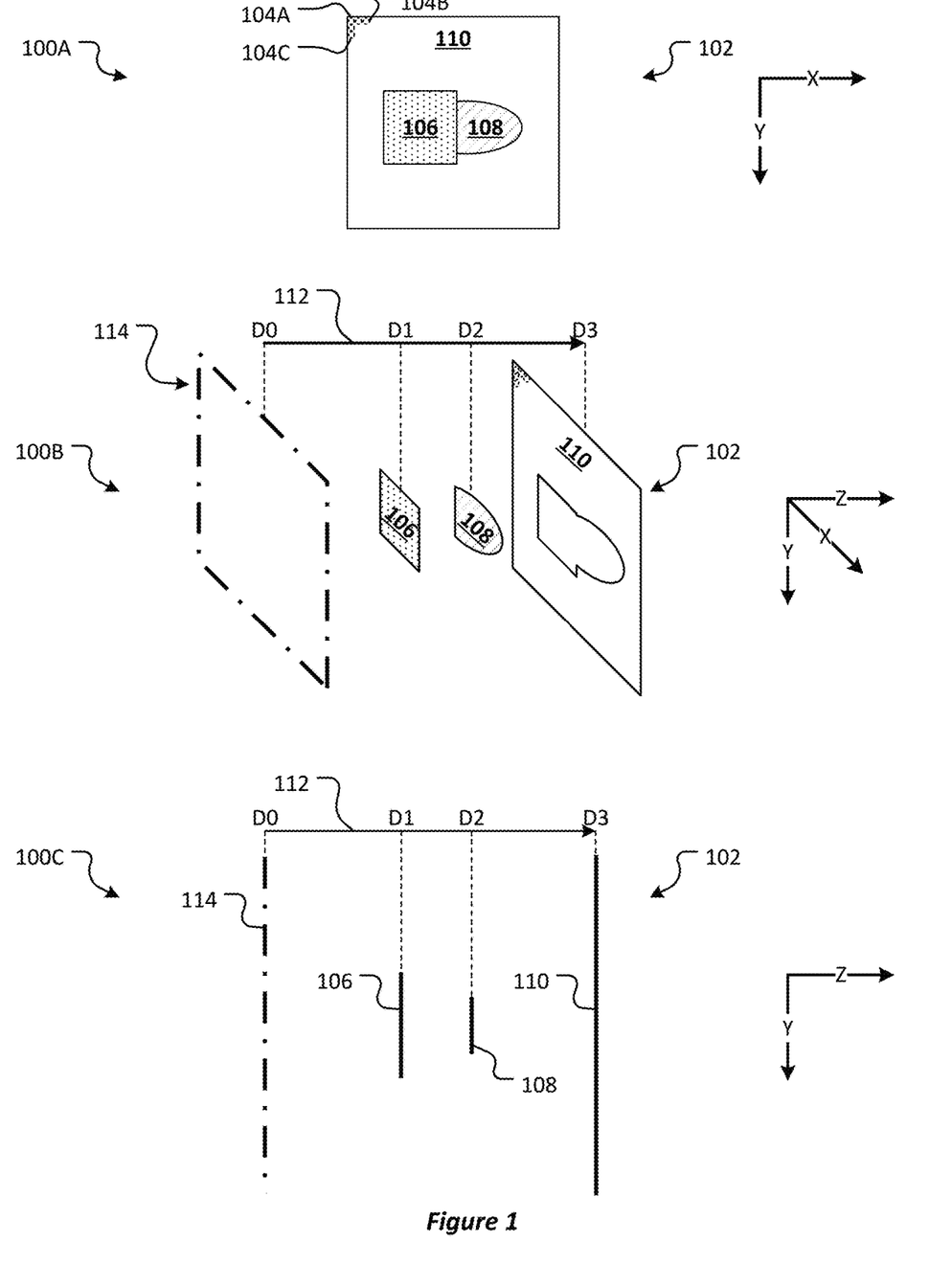
FIG. 1 provides views of an example sample image.

In order to illustrate the features of the present disclosure, an example input image will be used. FIG. 1 provides three views 100A-C of the same example image 102. Example image 102 includes three distinct image regions: a first (square-shaped) region 106; a second (partial ellipse-shaped) region 108 which is behind the first region 106, and a third region 110, which is the background/rearmost region.

View 100A provides a "flat" (or plan) view of image 102. Image 102 is defined by image data. The image data describes multiple pixels (examples of which are depicted with reference 104, though these are vastly enlarged) that make up the image 102. Generally speaking, for each pixel in the input image the input image data will define a two-dimensional (2D) pixel position and a pixel appearance.

A pixel's 2D position may be defined in any appropriate manner. As one example, image data may be (or include) a linear array of pixels (either row-wise or column-wise). In this case, for an image that is W pixels wide and H pixels high, a pixel at the 2D coordinates of (x,y) will be defined by the value at index [x+y*W] of the image's pixel array: e.g. pixel=imageArray[x+y*W].

In the present disclosure, pixel 2D positions are described in (x,y) coordinates for ease of reference. During processing, however, these 2D (x,y) positions will be mapped back to the underlying image format (e.g. to identify the particular pixel's position in the image's pixel array). To illustrate, and with reference to a coordinate system in which x coordinates increase from left to right and y coordinates increase from top to bottom, pixel 104A may have a 2D position of (0,0), pixel 104B may have a 2D position of (3,0), and pixel 104c may have a 2D position of (0,3). Continuing this example, if image 102 was a 10×10 image (i.e. width=10 and height=10), then: pixel 104A may be stored at array index 0 (0+0*10); pixel 104B may be stored at an array index of 3 (3+0*10); and pixel 104c may have be stored at an array index of 30 (0+3*10).

A pixel's appearance may also be defined in various ways—for example by RGB values (or other colour space values).

Views 100B and 100C depict image 102 with its pixels separated/exploded out along a depth or z dimension (indicated by arrow 112). View 100B is an exploded perspective view and view 100C an exploded elevation (or side-on) view. The pixel depths depicted in views 100B and 100C are based on depth data that is associated with image 102. Generally speaking, for each pixel described by the input image data the depth data defines a pixel depth—e.g. a z-coordinate. The depth data may be in various formats, for example in a depth map which has a format corresponding to the input image data except for a given pixel the depth data defines a pixel depth instead of the pixel's appearance. In this case, the depth for a pixel at 2D position $(x_1,y_1)$ (or, for example, imageArray[$x_1+y_1$*W] in the original image data can be determined by reference to the pixel at 2D position $(x_1,y_1)$ in the depth data (or, for example, depthArray[$x_1+y_1$*W]).

In example image 102, the depth data associated with image 102 indicates that: the pixels of the first region are at a depth of D1; the pixels of the second region are at a depth of D2; and the pixels of the third region are at a depth of D3 (D1<D2<D3).

FIGS. 1B and 1C also depicts a hypothetical imaging plane 114. For the purposes of the present description, imaging plane 114 provides a reference depth of 0.

It will be appreciated that image 102 is a particularly simple image which will be used for explanatory purposes. Typically, however, images will be far more complex, with pixels at many different depths.

Further versions of image 102 are used throughout this disclosure to assist in describing various features. In order to not obscure the features being described, however, not all reference numerals shown in FIG. 1 will be repeated in the further versions of image 102.

As noted above, embodiments of the present disclosure are concerned with processing digital images to simulate a depth of field effect. This involves processing an input image (such as image 102) to generate an output image in which a blurring effect has been applied in order to simulate a shallow depth of field at a particular depth within the image (the focal depth). For example, in the context of image 102, a user may select a focal depth of D2 with a view to having region 108 in sharp focus but regions 106 and 110 blurred. As an alternative example, a user may select a focal depth of D1 with a view to having region 106 in sharp focus but regions 108 and 110 blurred.

Generally speaking, the processing performed to generate an artificial depth of field effect involves processing each pixel of the input image (referred to as an input pixel) to generate a corresponding output image pixel (referred to an output pixel). For a given input pixel (referred to as the working pixel), the output pixel's appearance is based on a set of pixels that are selected from the input pixels (referred to as sample pixels).

In one technique known to the inventors (but that is not admitted to be common general knowledge), the sample pixels for a given working pixel is selected with reference to a sampling area (defined, for example, by a sampling radius). In this known technique, the sampling area for a given working pixel is determined based on the working pixel's depth (which changes depending on the particular working pixel in question) and the particular focal depth that has been set (which is the same for all working pixels).

Figure 2:
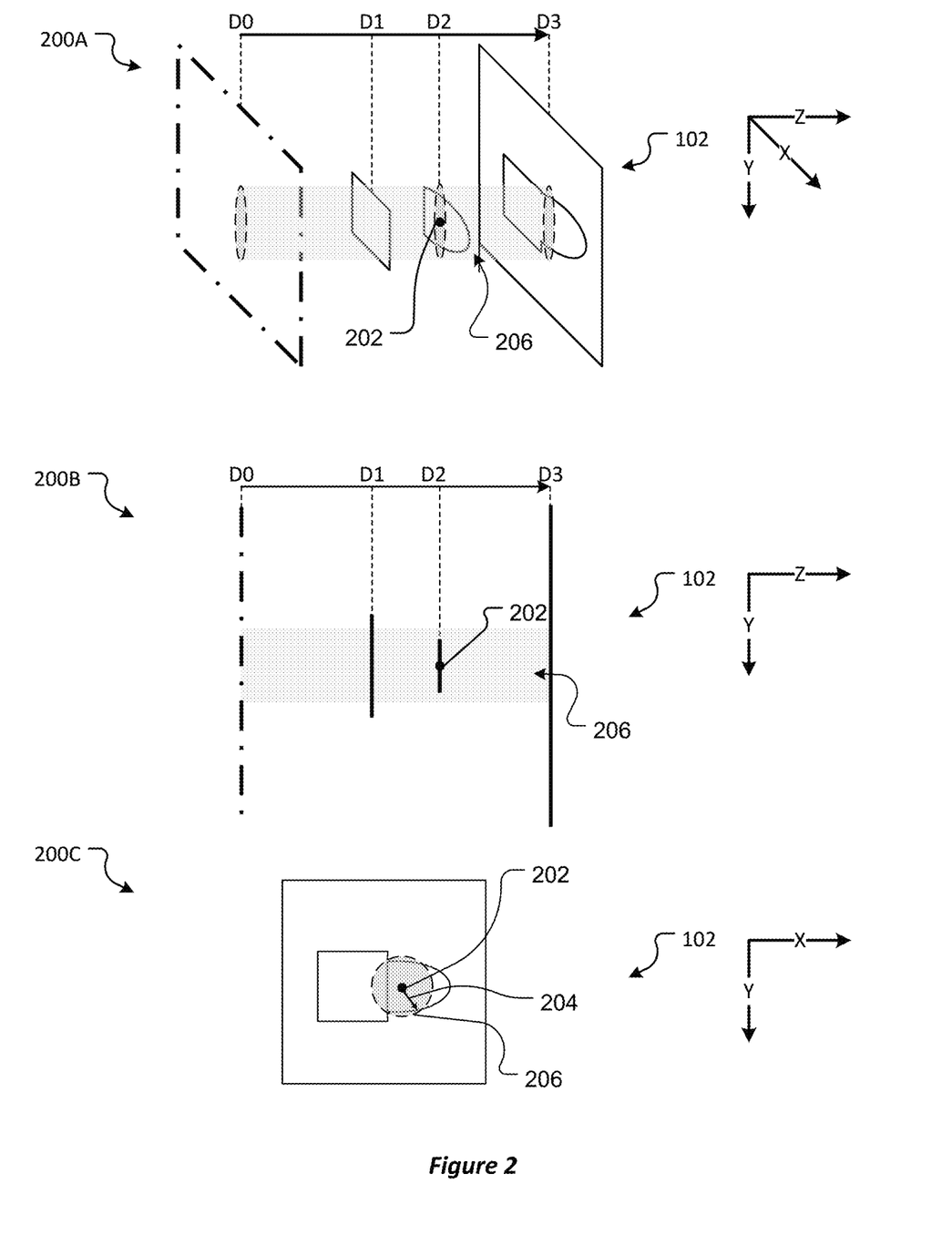
FIG. 2 provides further views of an example sample image.

To illustrate this, consider the annotated views 200 of image 102 shown in FIG. 2. In this example, it can be assumed that the focal depth has been set to D2. Further, an example working pixel 202 (also at depth D2) is depicted. Based on the focal depth and the depth of the working pixel (in this particular example, both depth D2), a sampling radius of 204 has been calculated. Sampling radius 206 defines a sampling area 204. As can be seen—particularly in views 200A and 200B which provide a three-dimensional depiction of the sampling area 204—the sampling area 206 for the working pixel is a constant area and does not does not change. When the depth dimension of the input image is taken into account the constant sampling area may be considered as forming a cylindrical volume (with a constant circular cross-section). In the known technique all input image pixels falling within the sample area 204—determined based on the input pixel 2D coordinates—are selected as sample pixels and, therefore, contribute to the output pixel that is generated to correspond to working pixel 202.

While generating processing a digital image according to this known technique does generate blurred regions and an artificial depth of field effect, the inventors have identified that the effect generated can include visible and undesirable image artefacts that arise from defocused regions picking up colour information from focused regions (e.g. colour bleed).

The present disclosure seeks to address this issue or, alternatively, provide a useful alternative mechanism for processing a digital image to generate a depth of field effect.

As noted, in the known technique described above, the sampling area for a given working pixel is (for a set focal depth) of a constant size, and all input pixels that fall within that sampling area are used to calculate the output pixel corresponding to that working pixel. The inventors have identified ways in which an improved depth of field effect (or other kernel-based image processing technique) may, at least in some circumstances be generated. One technique will be referred to as the depth-adjusted sampling area technique and the second will be referred to as the sampling area subset technique. In certain embodiments of the present disclosure both of these techniques are used in combination. In alternative embodiments, however, the depth-adjusted sampling area technique may be implemented without the sampling area subset technique.

In the depth-adjusted sampling area technique, when generating an output image based on a particular focal depth, the sampling area for a given working pixel is not a constant size area. Instead, what will be referred to as a depth-adjusted sampling area is calculated and used for each working pixel. In the processing described below, when determining whether a given input pixel (referred to as a candidate pixel) is selected as a sample pixel for a given working pixel, a depth-adjusted sampling area is calculated based on the depth (or z-axis) separation between the working pixel and the candidate pixel. If the candidate pixel is positioned within the depth-adjusted sampling area it is selected as a sample pixel for the given working pixel; if the candidate pixel falls outside the depth-adjusted sampling area it is not selected as a sample pixel for the given working pixel.

More specifically, in the present disclosure the size of the sampling area for a given working pixel (and a given focal distance) increases as the depth separation between a candidate sample pixel and the working pixel increases.

Figure 3:
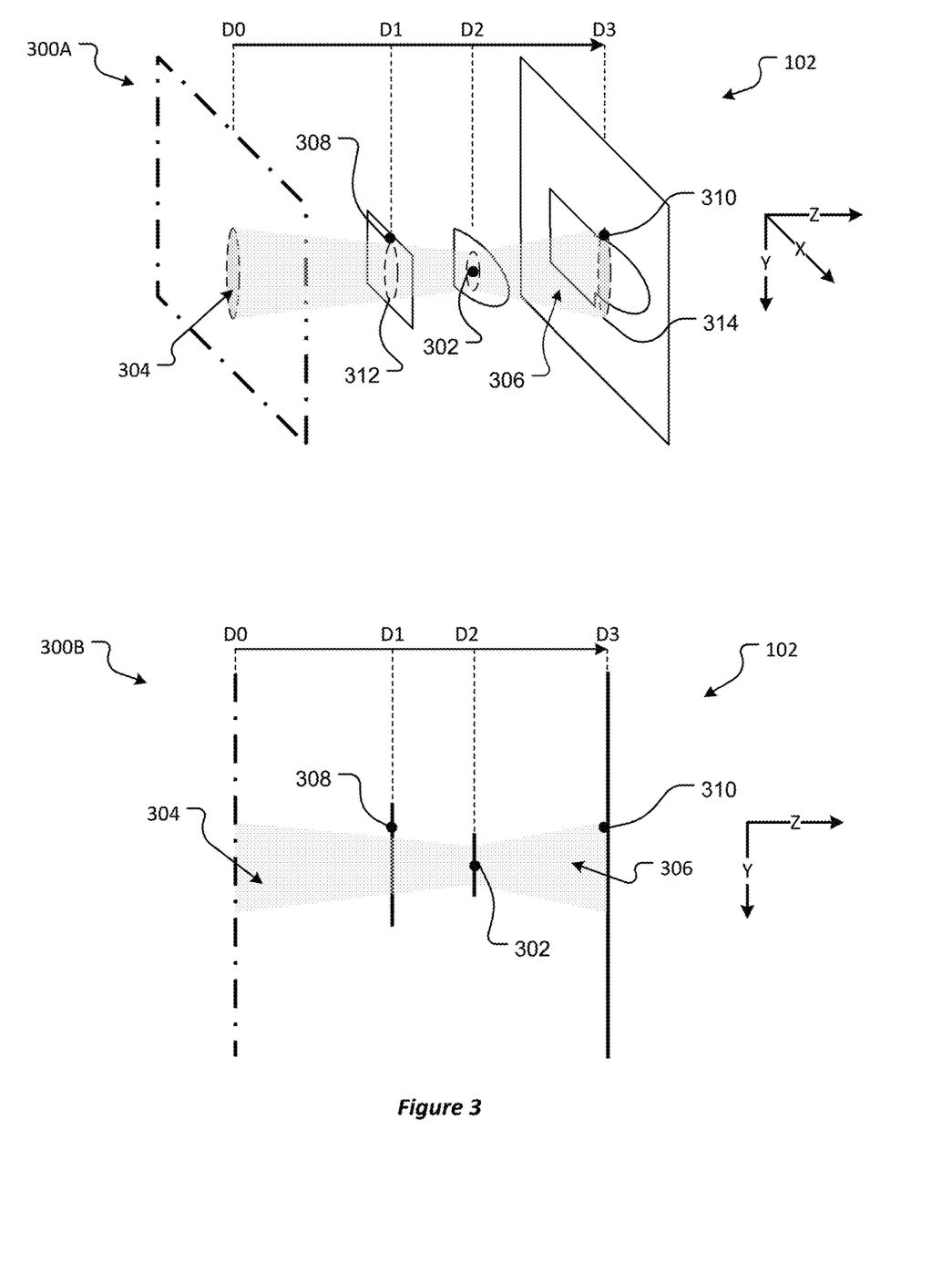
FIG. 3 provides further views of an example sample image.

To illustrate this, FIG. 3 provides further views 300 of image 102. As with the example of FIG. 2, a focal depth of D2 is selected and a working pixel 302 (also at depth D2) is depicted. As depicted in views 300A and 300B, the depth-adjusted sampling areas calculated in accordance with the present disclosure can (where sampling areas are defined by radii) be visualised as creating a pair of roughly conical-shaped volumes: one (304) projecting forward from the working pixel 302 (i.e. towards the foreground) and one (306) projecting rearward from the working pixel 302 (i.e. towards the background). Each volume's cross-section increases the further away the volume is from the working pixel.

To further illustrate the depth-adjusted sampling area, the views of FIG. 3 also depict two different candidate pixels: a first candidate pixel 308 and a second candidate pixel 310. In this example, the first and second candidate pixels 308 and 310 are the same two-dimensional distance from the working pixel 302 (as indicated by arrows D1 and D2 in view 300C, which represent the same distance). Candidate pixels 308 and 310 are, however, at different depths: the first candidate pixel 308 is at depth D1 and that the second candidate pixel 310 is at depth D3. Because of their different depths, the depth-adjusted sampling area 312 calculated for candidate pixel 308 is smaller than the depth-adjusted sampling area 314 calculated for candidate pixel 310 (this is depicted in views 300D and 300E respectively). As a result, candidate pixel 308 is not selected as a sample pixel for working pixel 302 but candidate pixel 310 is selected. This is even though candidate pixels 308 and 310 are the same two-dimensional distance from the working pixel 302 (and the same focal depth is being considered).

This can be contrasted with the known technique described above with reference to FIG. 2, where if two candidate pixels are the same two-dimensional distance from the working pixel (and the same focal depth is being considered) those two candidate pixels will either both fall within the constant-size sampling area (and both be selected) or will both fall outside the constant-size sampling area (and neither will be selected).

The inventors have identified that by implementing a depth-adjusted sampling area an output image with an improved blurring effect can be generated.

In the sampling area subset technique, when selecting sample pixels for a given working pixel, instead of selecting all candidate pixels that fall within the relevant sampling area only a subset of the candidate pixels that fall within the relevant sampling area are selected. In the embodiments described herein, the subset of pixels is randomly selected.

Once again, the inventors have identified that by implementing a sampling area subset technique an output image with an improved blurring effect can be generated.

The image processing techniques described herein are performed by one or more computer processing systems. An example computer processing system 400 which is configurable to implement the embodiments and features described herein will be described with reference to FIG. 4.

System 400 is a general purpose computer processing system. It will be appreciated that FIG. 4 does not illustrate all functional or physical components of a computer processing system. For example, no power supply or power supply interface has been depicted, however system 400 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Figure 4:
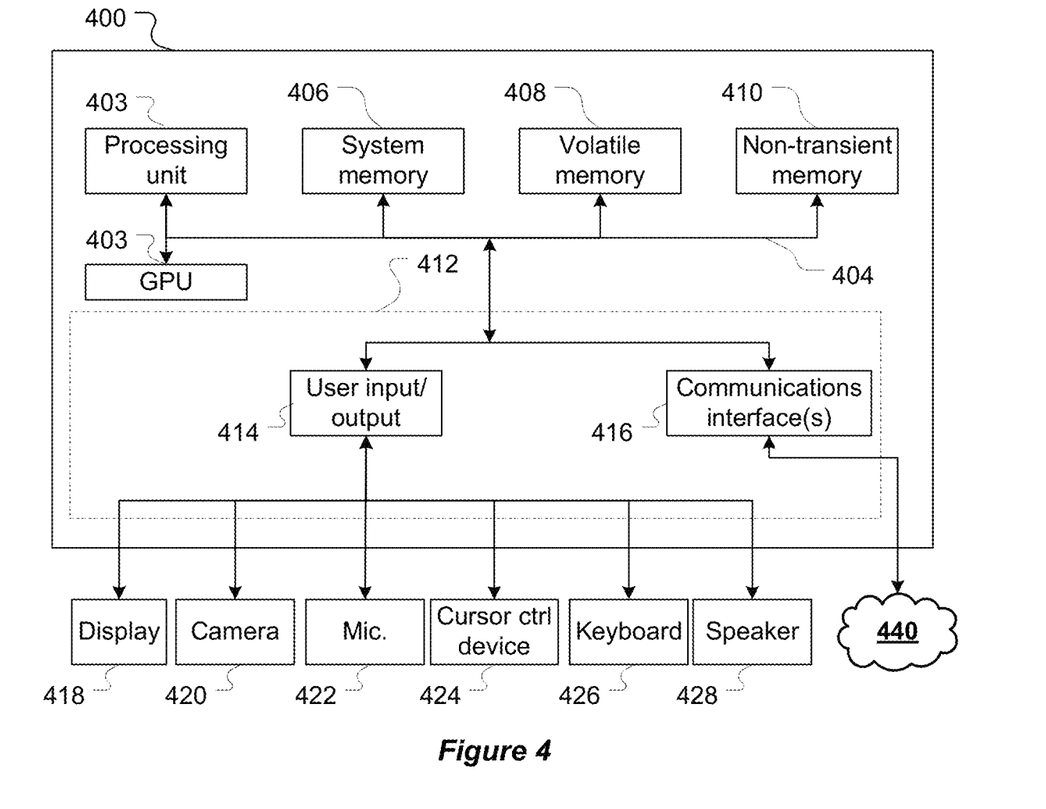
FIG. 4 is a block diagram of a computer processing system configurable to perform various features of the present disclosure.

Computer processing system 400 includes at least one processing unit 402—e.g. a central processing unit 402. Computer processing system may also include a separate graphics processing unit 403. In some instances, where a computer processing system 400 is described as performing an operation or function all processing required to perform that operation or function will be performed by processing unit 402. In other instances, processing required to perform that operation or function may be performed by the graphical processing unit 403. In still further instances, processing required to perform that operation or function may be performed by remote processing devices accessible to and useable by (either in a shared or dedicated manner) system 400.

Through a communications bus 404 the processing unit 402 (and, if present 403) is in data communication with a one or more machine readable storage (memory) devices which store computer readable instructions and/or data which are executed by the processing unit 402 to control operation of the processing system 400. In this example system 400 includes a system memory 406 (e.g. a BIOS), volatile memory 408 (e.g. random access memory such as one or more DRAM modules), and non-transient memory 410 (e.g. one or more hard disk or solid state drives).

System 400 also includes one or more interfaces, indicated generally by 412, via which system 400 interfaces with various devices and/or networks. Generally speaking, other devices may be integral with system 400, or may be separate. Where a device is separate from system 400, connection between the device and system 400 may be via wired or wireless hardware and communication protocols, and may be a direct or an indirect (e.g. networked) connection.

Wired connection with other devices/networks may be by any appropriate standard or proprietary hardware and connectivity protocols. For example, system 400 may be configured for wired connection with other devices/communications networks by one or more of: USB; eSATA; Ethernet; HDMI; and/or other wired connections.

Wireless connection with other devices/networks may similarly be by any appropriate standard or proprietary hardware and communications protocols. For example, system 400 may be configured for wireless connection with other devices/communications networks using one or more of: BlueTooth; WiFi; near field communications (NFC); Global System for Mobile Communications (GSM), and/or other wireless connections.

Generally speaking, and depending on the particular system in question, devices to which system 400 connects—whether by wired or wireless means—include one or more input devices to allow data to be input into/received by system 400 and one or more output device to allow data to be output by system 400. Example devices are described below, however it will be appreciated that not all computer processing systems will include all mentioned devices, and that additional and alternative devices to those mentioned may well be used.

For example, system 400 may include or connect to one or more input devices by which information/data is input into (received by) system 400. Such input devices may include keyboard, mouse, trackpad, microphone, accelerometer, proximity sensor, GPS, and/or other input devices. System 400 may also include or connect to one or more output devices controlled by system 400 to output information. Such output devices may include devices such as a display (e.g. a LCD, LED, touch screen, or other display device), speaker, vibration module, LEDs/other lights, and/or other output devices. System 400 may also include or connect to devices which may act as both input and output devices, for example memory devices (hard drives, solid state drives, disk drives, and/or other memory devices) which system 400 can read data from and/or write data to, and touch screen displays which can both display (output) data and receive touch signals (input).

By way of example, where system 400 is an end user device (such as a desktop computer, laptop computer, smart phone device, tablet device, or other device) it may include a display 418 (which may be a touch screen display), a camera device 420, a microphone device 422 (which may be integrated with the camera device), a cursor control device 424 (e.g. a mouse, trackpad, or other cursor control device), a keyboard 426, and a speaker device 428.

System 400 also includes one or more communications interfaces 416 for communication with one or more networks, such as network 440 (e.g. a local area network, a wide area network, a public network). Via the communications interface(s) 416, system 400 can communicate data to and receive data from networked systems and/or devices.

System 400 may be any suitable computer processing system, for example, a server computer system, a desktop computer, a laptop computer, a netbook computer, a tablet computing device, a mobile/smart phone, a personal digital assistant, or an alternative computer processing system.

System 400 stores or has access to computer applications (also referred to as software or programs)—i.e. computer readable instructions and data which, when executed by the processing unit 402, configure system 400 to receive, process, and output data. Instructions and data can be stored on non-transient machine readable medium such as 410 accessible to system 400. Instructions and data may be transmitted to/received by system 400 via a data signal in a transmission channel enabled (for example) by a wired or wireless network connection over an interface such as communications interface 416.

Typically, one application accessible to system 400 will be an operating system application.

In addition, system 400 will store or have access to applications which, when executed by the processing unit 402, configure system 400 to perform various computer-implemented processing operations described herein. For example, in the present examples system 400 includes a depth of field effect module. This may be a software module which is executed to configure system 400 to perform the processing described herein.

Figure 5:
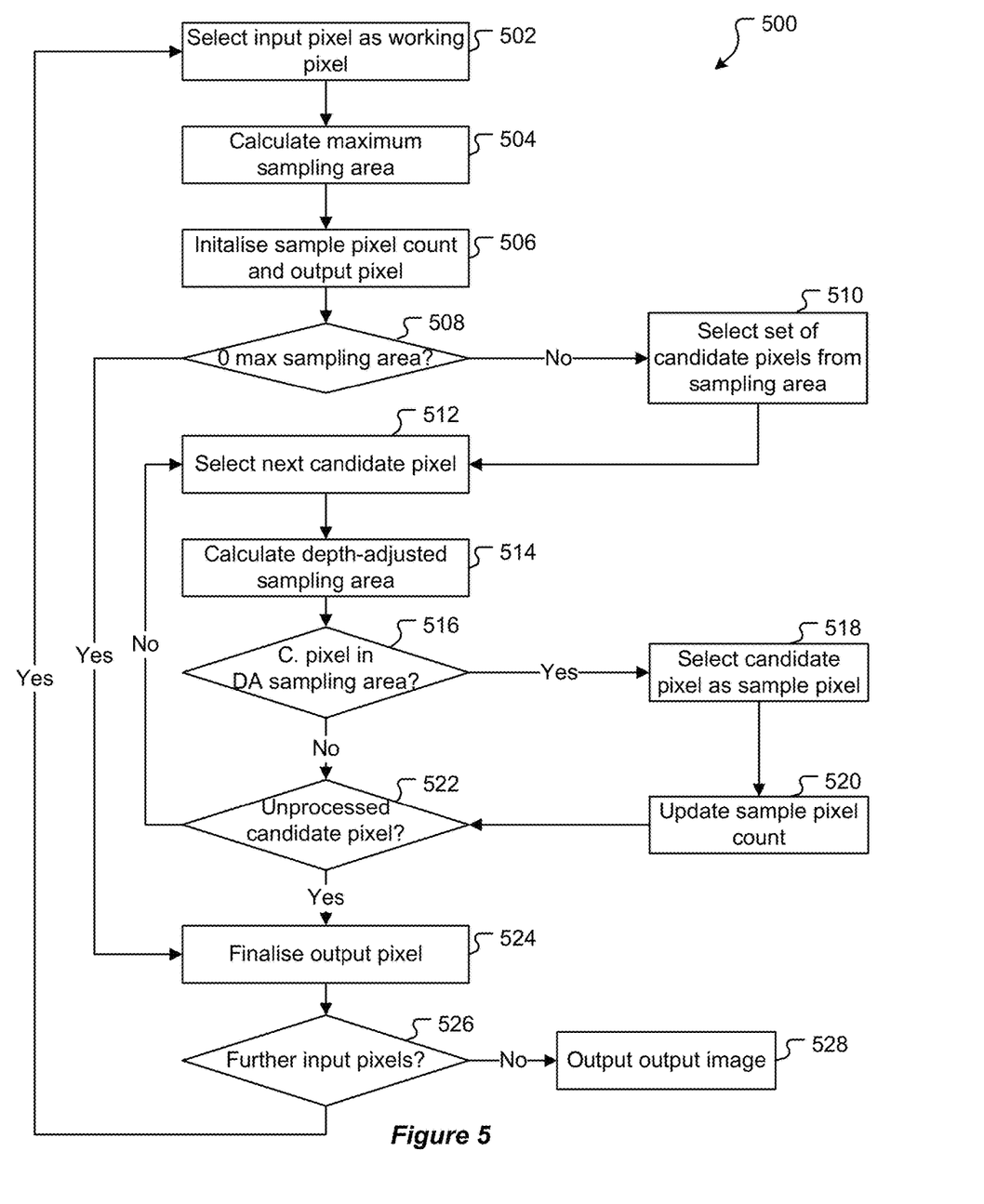
FIG. 5 depicts operations performed in an image processing method.

Turning to FIG. 5, an image processing method 500 for simulating a depth of field effect will be described. The image processing method is performed by a computer processing system such as 400.

Figure 7:
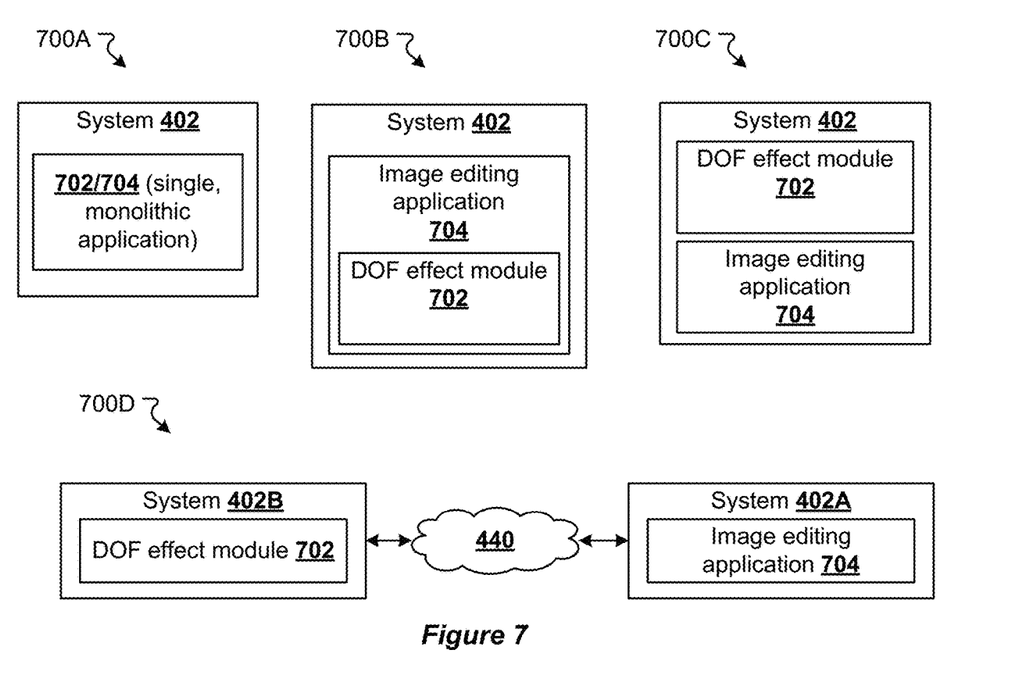
FIG. 7 depicts various architectures in which the features of the present disclosure may be implemented.

In the present examples, system 400 is configured to perform the image processing method 500 by a depth of field effect module 702. In the present examples the depth of field effect module 702 is a software module—i.e. data and computer readable instructions which are stored in memory (e.g. volatile memory 408) for execution by one or more processing units. Given the nature of the processing performed in accordance with method 500, processing will often be performed by a graphics processing unit such as GPU 403. Processing may, however, be performed by a central processing unit such as CPU 402 (either alone or in conjunction with a GPU such as 403). Generally speaking, however, execution of the instructions causes the system 402 to perform the described operations.

In alternative embodiments, the depth of field effect module 702 may be (or include) a hardware module—i.e. specially configured hardware for performing some or all the operations of method 500.

The image processing method 500 of the present embodiments includes the following inputs: input image data, depth data, a focal depth, a blur scaling factor, a sampling area scaling factor, and a maximum candidate pixels value.

As described above, the input image data defines a plurality of input pixels, each having an input pixel position (which, as discussed above, can be mapped to an x, y coordinate pair) and an input pixel appearance. The input image data is defined by user input—e.g. a user selecting an image for processing. The input image data may be accessed from locally accessible memory (e.g. non-transient memory 410 or an alternative data storage device connected to system 400) or from a remote source (e.g. from a networked data storage device or remote server accessed via communications interface 416 and network 440).

Method 500 may be used with (or be adapted to be used with) any raster image format—e.g. .jpg, .png, .bmp, and/or any other raster format which represents an image as a set of pixels (and for which pixel depth can be determined—e.g. via a corresponding depth map or other depth data). Where an input image's original format is not of a format that method 500 is able to process directly, the original image may be converted to a suitable format (e.g. by known conversion algorithms or applications). This also applies to vector graphic images which can be rasterised.

As also described above, the depth data provides a depth value (e.g. a z value) for each input pixel. The depth data may be stored with (and accessed from) the same location as the input image data. Alternatively, if depth data is not available system 400 may obtain or generate depth data corresponding to the input image in various ways. For example, system 400 may itself (and automatically) process the input image to generate corresponding depth data (e.g. by depth of field effect module 702 or an alternative application running on system 400). Alternatively, system 400 may be configured to automatically communicate a request which includes the input image data to a remote system (e.g. a server system accessible via network 440) which is configured to process input image data to generate and return depth data.

Accordingly, between the input image data and depth data, for each pixel of the input image method 500 has access to (or can calculate) an input pixel's: two dimensional position ((x,y) coordinates being used herein for ease of reference); depth (e.g. a z coordinate), and appearance (e.g. an RGB or other colour space value).

The focal depth defines the depth (e.g. z value) at which the output image is intended to be sharp. As described further below with reference to FIG. 6, the focal depth may be a user defined value.

As will become apparent from the below, the blur scaling factor is a value that impacts the maximum sampling area that is calculated for a given working pixel and, therefore, the blurring effect generated by the image processing method 500. In some implementations, the blur scaling factor may be a user defined variable. In other implementations, the blur scaling factor may be defined by the depth of field effect module 702 itself. In the context of the processing and calculations described below, a blur scaling factor value within a range of 0 to 1 will typically be appropriate (though that alternative values may be used).

The blur scaling factor may be normalised based on the size of the image being processed. For example, a normalised blur scaling factor may be calculated based on the shortest side of the image being processed—e.g.:

blur_scaling_factor_normalised=blur_scaling_factor*minimum(image_width,image_height)

The sampling area scaling factor is a scaling factor that is used to calculate the depth-adjusted sampling area for a given working pixel/candidate pixel pair. This is described further below. The sampling area scaling factor may be provided as a user defined variable. Typically, however, the sampling area scaling factor will be defined by the depth of field effect module 702 itself. In the context of the processing and calculations described below, a sampling area scaling factor value may take any value greater than zero. As one example, a sampling area scaling factor within a range of 0 to 1 will typically be appropriate (though alternative values may be used).

The sampling area scaling factor may also be normalised based on the size of the image being processed. For example:

sampling_area_scaling_factor_normalised=sampling_area_scaling_factor*minimum(image_width, image_height)

The maximum candidate pixels value is a value that defines a maximum number of candidate pixels that will be considered for selection as sample pixels for a given output pixel. This may be provided as a user defined variable. Typically, however, the maximum number of candidate pixels will be defined by the depth of field effect module 702 itself. In the context of the processing and calculations described below, a maximum number of candidate pixels value may take any value greater than zero. By way of specific example, a maximum candidate pixels value of between 100 and 200 will typically be appropriate.

Over the course of method 500, system 400 generates an output image data which defines a plurality of output pixels. Each output pixel corresponds to an input pixel and has an output pixel position and an output pixel appearance. Method 500 is described as processing each and every input pixel to generate a corresponding output pixel. It may be possible, however, to process a subset of input pixels to generate corresponding output pixels. In this case other input pixels may be ignored (effectively converting the input image to a lower resolution) or may be processed according to a different algorithm.

At 502, system 400 selects an unprocessed input pixel from the input image data. The input pixel selected at 502 will be referred to as the working pixel.

System 440 may be configured to select input pixels for processing in any appropriate order. Furthermore, system 440 may be configured to perform method 500 in a parallel fashion, in which case multiple processing threads may be operating to process multiple input pixels at the same time.

At 504, system 400 calculates a maximum sampling area for the current working pixel. In the present example, the maximum sampling area is based on the blur scaling factor and the depth-distance between the working pixel and the focal depth.

By way of specific example, system 400 may be configured to calculate a maximum sampling area radius which (together with the 2D position of the current working pixel) defines the maximum sampling area. In the present example, the maximum sampling area radius is calculated according to the following formula:

Maximum sampling area radius=blur scaling factor*absolute value(working pixel depth—focal depth)

The working pixel depth is obtained from (or calculated based on) the depth data.

At 506, system 400 initialises a sample pixel count variable and an output pixel that will, ultimately, correspond to the currently selected working pixel. The output pixel will ultimately have the same position as the currently selected working pixel. The output pixel is initialised with an appearance value that is equal to that of the working pixel selected at 502. The sample pixel count variable is initialised to 1 (indicating that, at this stage, the output pixel is made up of a single input pixel—i.e. the working pixels).

At 508, system 400 determines whether the maximum sampling area calculated at 504 has a zero size. This will be the case if the working pixel depth and focal depth are the same. If the maximum sampling area has a zero size, processing proceeds to 524 (in this case the output pixel takes the value of the input pixel without any change). If the maximum sampling area has a non-zero size, processing proceeds to 512.

At 510, system 400 selects a set of candidate pixels for the current working pixel.

A candidate pixel is an input pixel that is positioned the maximum sampling area: i.e. an input pixel that has a 2D distance from the current working pixel that is less than or equal to the maximum sampling area radius. The 2D distance between a given input pixel and the current working pixel may be calculated, for example, as:

$$\text{2D distance} = \sqrt{(x_w - x_i)^2 + (y_w - y_i)^2}$$

Where: $x_w$=working pixel's x coordinate; $y_w$=working pixel's y coordinate; $x_i$=input pixel's x coordinate; $y_i$=input pixel's y coordinate.

Furthermore, in the present embodiment system 400 is configured so that the set of candidate pixels selected for a given working pixel is a subset of the input pixels that fall within the maximum sampling area. That is, system 400 is configured to select a maximum number of input pixels (as defined by the maximum candidate pixel value described above) as candidate pixels, the maximum candidate pixel value defining a number that is less than the number of input pixels that fall within the maximum sampling area.

In order to achieve this, in the present embodiment system 400 is configured to randomly select up to a defined number (the maximum candidate pixel value) of input pixels from within the maximum sampling area for inclusion in the set of candidate pixels. Alternative mechanisms for selecting a subset of input pixels as sample pixels may be implemented.

At 512, system 400 selects the next unprocessed candidate pixel (from the set of candidate pixels) for processing. Candidate pixels from the set of candidate pixels may be processed in any order.

At 514, system 400 calculates a depth-adjusted sampling area for the currently selected candidate pixel and currently selected working pixel.

In the present implementation, the depth-adjusted sampling area is calculated based on the sampling area scaling factor and the depth separation between the currently selected candidate pixel and the current working pixel.

The depth separation between the currently selected candidate pixel and the current working pixel can be calculated as:

depth separation=absolute value(candidate pixel depth−working pixel depth)

The candidate and working pixel depths are obtained from (or calculated based on) the depth data.

In the present example, system 400 calculates a depth-adjusted sampling area radius which (together with the 2D position of the current working pixel) defines the depth-adjusted sampling area. In the present example, the depth-adjusted sampling area radius for a given candidate pixel and a given working pixel is calculated according to the following formula:

depth-adjusted sampling area radius=sampling area scaling factor*depth separation between candidate pixel and working pixel As described above, the views 300 of FIG. 3 provide visual depictions of depth-adjusted sampling areas—for example depth-adjusted sampling area 312 as determined for working pixel 302 and candidate pixel 308, and depth-adjusted sampling area 314 as determined for working pixel 302 and candidate pixel 310.

At 516, system 400 determines if the currently selected candidate pixel is positioned within the depth-adjusted sampling area calculated at 514. In the present example, this involves system 400 calculating whether the 2D distance between the currently selected candidate pixel and currently selected working pixel is less than the depth-adjusted sampling area radius. The 2D distance between the currently selected candidate pixel and currently selected working pixel may already have been calculated at 510 (when selecting the current candidate pixel for inclusion in the set of candidate pixels), though can be recalculated if necessary. If the currently selected candidate pixel is positioned within the depth-adjusted sampling area processing proceeds to 518. In this case, and generally speaking, the candidate pixel is selected as a sample pixel which will contribute to the appearance of the output pixel being generated for the currently selected working pixel.

In the present implementation, to select a candidate pixel as a sample pixel at 518 system 400 adds the currently selected candidate pixel (e.g. the RGB value thereof) to the current output pixel appearance value—e.g.:

output pixel appearance=output pixel appearance+ current candidate pixel appearance Where RGB values are used, two RGB values may be summed by adding together the pairs of R, G, and B (and, if present, alpha) components of the two values.

At 520, system 400 increments that sample pixel count variable (e.g. sample pixel count=sample pixel count+1). This indicates that an additional input pixel has been added to the output pixel. Processing then proceeds to 522.

If, at 516, system 400 determines that the currently selected candidate pixel is not positioned within the depth-adjusted sampling area, the candidate pixel is not selected as a sample pixel (and, therefore, will not contribute to the appearance of the output pixel being generated for the currently selected working pixel). In this case processing proceeds directly to 522.

At 522, system 400 determines whether all candidate pixels in the set of candidate pixels have been processed. If so, processing proceeds to 524. If there are unprocessed candidate pixels in the set of candidate pixels, processing returns to 512 to select the next candidate pixel for processing.

At 524, system 400 finalises the output pixel corresponding to the current working pixel. In the present example, finalising an output pixel involves averaging the output pixel's value, e.g.:

output pixel appearance=output pixel appearance/ sample pixel count

Processing then proceeds to 526.

At 526, system 400 determines if there are any further input pixels that require processing. If so, processing returns to 502 to select the next input pixel for processing.

If, at 526, all input pixels have been processed processing proceeds to 528. At 5528, all output pixels have been generated. Accordingly, system 400 finalises the output image (which is composed of the output pixels) and outputs that image. System 400 may output the output image in various ways, for example by rendering the output image on a display (e.g. 418), saving the output image to memory (e.g. 410), communicating the output image to another application (running on system 200 or an alternative system), and/or by any other appropriate output mechanism.

In the examples above the maximum sampling area and depth-adjusted sampling area (calculated at 504 and 514 respectively) are circular areas defined by radius values. In alternative implementations, the maximum sampling area and/or the depth-adjusted sampling area may be defined by data other than radius values and may be of any desired shape. For example, the maximum sampling are and/or depth-adjusted sampling area may be polygonal areas defined (for example) by sets of vertices (each vertex defined in turn by, for example, an (x,y) coordinate pair).

Where the sampling areas are not circular/cannot be defined by a single value (e.g. a radius), a sampling area scaling function may be required instead of a single sampling area scaling factor value. By way of example, if the depth-adjusted sampling area is a polygonal area defined by a set of vertices, a sampling area scaling function may define transformations that are to be applied to each vertex. Similarly, in this case more complex geometric calculations may be required to determine whether an input pixel falls within the maximum sampling area (e.g. when determining the set of candidate pixels at 510) and/or when determining whether a given candidate pixel falls within a depth-adjusted sampling area (at 516).

Method 500 as described above makes use of both the depth-adjusted sampling technique (e.g. by determining sample pixel selection at 516 with reference to a depth-adjusted sampling area) and the sampling area subset technique (e.g. by selecting—randomly in the described embodiment—a set of candidate pixels at 510). In alternative implementations, one of these techniques may be used without the other.

For example, method 500 as described and illustrated may be adapted to make use of the depth-adjusted sampling technique only. In this case, and for example, every pixel within the maximum sampling area determined at 504 is included in the set of candidate pixels at 510 (e.g. there is, effectively, no maximum number of candidate pixels).

As an alternative example, method 500 as described and illustrated may be adapted to make use of the sampling area subset technique only. In this case, and for example all candidate pixels in the set of candidate pixels are selected as sample pixels without calculating a depth-adjusted sampling area (at 514) or testing if a candidate pixel falls within that area (at 516).

Image processing method 500 may be called or invoked in a variety of contexts. In one example, computer processing system 400 includes an image processing application (e.g. application 704 described below) that, when executed, causes an image editing graphical user interface (GUI) to be displayed on a display 418. Via the image editing GUI a user can select an image and trigger processing according to method 500 to generate and apply an artificial depth of field effect to that image.

Figure 6:
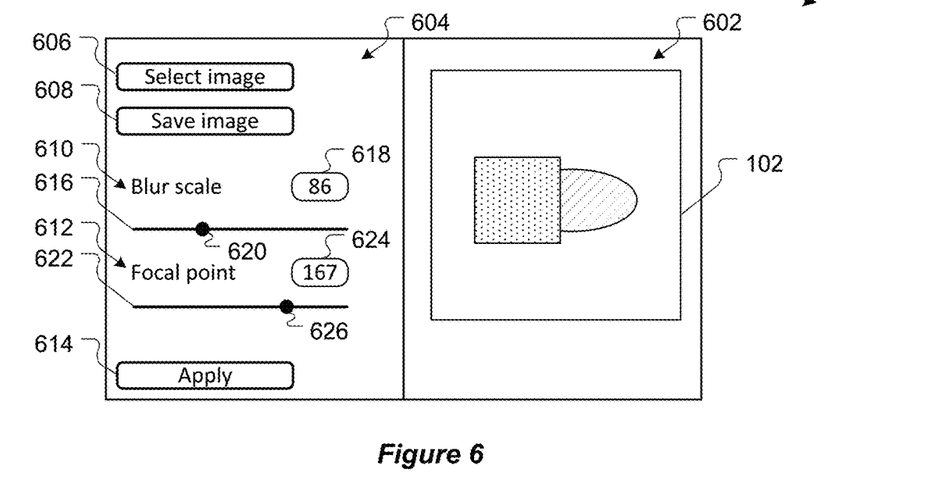
FIG. 6 depicts an example graphical user interface.

FIG. 6 provides one example of an image editing GUI 600.

Example GUI 600 includes an image preview region 602 which displays a preview of an image (in this particular example image 102).

Example GUI 600 also includes a control region 604 which, in this particular example, includes a select image control 606, a save image control 608, a blur scaling factor control 610, a focal depth control 612, and an apply control 614.

In the present example, a user can interact with the select image control 606 to select an image for processing. The selected image is displayed in the preview region 602. Activation of the select image control 606 may cause the image editing application to launch a select image user interface which allows a user to browse or search for an image. This may include locally stored images (e.g. stored in non-transient memory 410 or other memory directly accessible to system 200) and/or remotely stored images (e.g. available from a remote storage location or system accessible over a communications network such as 440).

In the present example, a user can interact with the save image control 608 to save the image currently displayed in the preview region 602—e.g. after applying an artificial depth of field effect to an input image selected via control 606. Activation of the save image control 608 may cause the image editing application to launch a save image user interface which allows a user to select a save location and/or other image parameters (e.g. an image format, an image quality, an image size, and or other parameters). The save image interface may allow a user to save the image to locally accessible memory (e.g. non-transient memory 410 or other memory directly accessible to system 200) and/or a remote location (e.g. a location accessible over a communications network such as 440).

While not shown, additional controls for outputting the image in alternative ways may be provided. For example, one or more share controls may be provided allowing a user to: launch a communications application and attach the image to an electronic communication (e.g. email, instant message, short message service, other application); electronically publish the image to a social media site or other media sharing website); and/or to share the image via other mechanisms. As a further example, a print control may be provided allowing the user to specify print parameters and send the image to a local or network accessible printer. The printer then prints the image on a printed product. The printed product may be any appropriate product, e.g. a printed photograph, a poster, a book, a banner, a keyring, coffee cup, a magnet, a decal, a sticker, an item of clothing, and/or any other product onto which an image may be printed.

In the present example, a user can interact with the blur scaling factor control 610 to set the blur scaling factor to be used in the image processing method 500. In this example, the blur scaling factor control 610 includes a sliding control 616 and a value field 618. A user can interact with the handle 620 of the sliding control to adjust the blur scaling factor. The numeric value of the selected blur scaling factor is displayed in the value field 618. Alternatively, a user may select and directly enter a desired blur scaling factor into the value field 618 (in which case the position of the handle 620 is updated accordingly).

In the present example, a user can interact with the focal depth control 612, to set the focal depth to be used in the image processing method 500. In this example, the focal depth 612 includes a sliding control 622 and a numeric field 624. A user can interact with the handle 626 of the sliding control to adjust the focal depth. The numeric value of the selected focal depth is displayed in the numeric field 624. Alternatively, a user may select and directly enter a desired focal depth into the numeric field 625 (in which case the position of the handle 626 is updated accordingly).

When an image is initially selected (via select image control 606) and displayed in the image preview image editing application may be configured to select default values for the blur scaling factor and the focal depth.

In the present example, a user can interact with the apply control 614 to cause processing to simulate a depth of field effect (e.g. in accordance with method 500 described above, and with a blur scaling factor and focal depth as selected via controls 610 and 612). As discussed with reference to FIG. 7 below, in certain implementations the depth of field effect module 702 may be a native part of the image editing application 704, while in other implementations the depth of field effect module 702 is separate to the image processing application 704. Once the image has been processed and an output image generated, the image editing application 704 displays the output image in the image preview area 602.

In other embodiments the apply control 614 may be omitted. In this case, the image editing application may automatically process the image (or cause the image to be processed) to simulate a depth of field effect (and display the output image) as a user updates the blur scaling factor and/or focal depth. This allows a user to receive real-time (or near real-time, depending on the processing capabilities of system 200) visual feedback of the impact that changes to the blur scaling factor and/or focal depth have on the image.

It will be appreciated that many variations on GUI 600 are possible, and a given image editing application will typically provide additional functions to those depicted and described.

It will also be appreciated that various architectures in which the processing described here can be performed are possible. FIG. 7 provides several potential architectures 700 by way of example (though still further architectures are possible).

In example architecture 700A, the depth of field effect module 702 (which actually processes the input image to generate the output image) is an integral/native part of the image processing application 704 (that generates GUI 600 as described above)—i.e. a single monolithic application is provided.

In example architecture 700B, the depth of field effect module 702 is a plug-in or add-on to the image processing application 704.

In example architectures 700C and 700D, the depth of field effect module 702 and image processing application 704 are entirely separate software applications. In example architecture 700C, applications 702 and 704 run on the same computer processing system 402. In this case applications 702 and 704 may communicate with each other by any appropriate communication protocol.

In example architecture 700D, applications 702 and 704 run on separate computer processing systems that communicate with one another over one or more communications networks 440. In this case, and once again, applications 702 and 704 may communicate with each other by any appropriate communication protocol (e.g. http, https, defined API calls, or any other suitable protocol).

Where applications 702 and 704 are separate (e.g. per example architectures 700C and 700D), the image processing application 704 may be configured to communicate an input image (or as selected via control 606) and relevant parameters (as selected by controls 610 and 612) to the depth of field effect module 702. The depth of field effect module 702 then performs the relevant processing (e.g. per method 500 described above) and communicates the output image back to the image processing application 704. The image processing application 704 then displays the output image, for example in the image preview area 602.

If a particular image format is required for the artificial depth of field effect processing, and the original format of the input image is not in this format, the image may be converted to the required format by: the image processing application 704, the depth of field effect module 702 (where this is distinct from the image processing application 704), or a further application/process called specifically to convert the input image.

The flowchart of FIG. 5 defines operations in a particular order to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Further examples of specific feature combinations taught within the present disclosure are set out in the following clauses:

Clause 1. A computer implemented method including:
  accessing input image data defining a plurality of input pixels; and
  processing the input image data to generate an output image, the output image defined by output image data, the output image data defining a plurality of output pixels, wherein each output pixel corresponds to an input pixel and at least one output pixel is generated by a sampling process that includes:
    selecting a working pixel from the plurality of input pixels;
    selecting a set of sample pixels for the working pixel, wherein each sample pixel in the set of sample pixels is an input pixel that is selected as a sample pixel based on whether the input pixel is positioned within a depth-adjusted sampling area, the depth-adjusted sampling area for a particular input pixel being determined based on a depth separation between that particular input pixel and the working pixel; and
    generating an output pixel that corresponds to the working pixel based on the set of sample pixels.

Clause 2. The computer implemented method of clause 1, wherein selecting the set of sample pixels for a given working pixel includes:
  determining a set of candidate pixels for the given working pixel, each candidate pixel in the set of candidate pixels being an input pixel; and
  for each candidate pixel in the set of candidate pixels:
    determining a depth-adjusted sampling area for the candidate pixel based on a depth separation between the candidate pixel and the given working pixel;
    determining whether the candidate pixel is positioned in the depth-adjusted sampling area for that candidate pixel; and
    in response to determining that the candidate pixel is positioned the depth-adjusted sampling area for that candidate pixel, selecting the candidate pixel as a sample pixel.

Clause 3. The computer implemented method of clause 2, wherein determining the depth-adjusted sampling area for the candidate pixel is further based on a sampling area scaling factor.

Clause 4. The computer implemented method of clause 2 or clause 3, wherein:
  the depth-adjusted sampling area for the candidate pixel is defined by a depth-adjusted separation distance; and
  determining whether the candidate pixel is positioned in the depth-adjusted sampling area for the candidate pixel includes determining whether a two-dimensional separation distance between the candidate pixel and the given working pixel exceeds the depth-adjusted separation distance.

Clause 5. The computer implemented method of any one of clauses 2 to 4, wherein determining the set of candidate pixels for the given working pixel includes:
  determining a maximum sampling area for the given working pixel; and
  selecting input pixels from within the maximum sampling area as candidate pixels.

Clause 6. The computer implemented method of clause 5, wherein the maximum sampling area for the given working pixel is determined based on a focal depth and a depth of the given working pixel.

Clause 7. The computer implemented method of clause 5 or clause 6, wherein the maximum sampling area for the given working pixel is determined based on a blur scaling factor.

Clause 8. The computer implemented method of any one of clauses 5 to 7, wherein the maximum sampling area for the given working pixel is defined by a maximum separation distance.

Clause 9. The computer implemented method of any one of clauses 5 to 8, wherein determining the set of candidate pixels includes selecting a subset of input pixels that fall within the maximum sampling area as candidate pixels.

Clause 10. The computer implemented method of clause 9, wherein selecting the subset of input pixels that fall within the maximum sampling area as candidate pixels includes randomly selecting input pixels that fall within the maximum sampling area.

Clause 11. The computer implemented method according to any one of clauses 1 to 10, wherein generating the output pixel that corresponds to the working pixel based on the set of sample pixels includes averaging the sample pixels in the set of sample pixels.

Clause 12. The computer implemented method according to any one of clauses 1 to 11, wherein processing the input image data to generate the output image data includes generating an output pixel corresponding to each input pixel.

Clause 13. The computer implemented method according to any one of clauses 1 to 12, wherein each output pixel is generated according to the sampling process.

Clause 14. The computer implemented method of any one of clauses 1 to 13, further including displaying the output image on a display.

Clause 15. The computer implemented method of any one of clauses 1 to 14, further including saving the output image to non-transient memory.

Clause 16. The computer implemented method of any one of clauses 1 to 15, further including printing the output image on a printed product.

Clause 17. A computer processing system including:
  one or more processing units; and
  a non-transient computer-readable storage medium storing instructions, which when executed by the one or more processing units, cause the processing unit to perform a method according to any one of clauses 1 to 16.

Clause 18. A non-transient storage medium storing instructions executable by one or more processing units to cause the one or more processing units to perform a method according to any one of clauses 1 to 16.

Clause 19. A printed product including an output image printed thereon, the output image generated in accordance with a method according to any one of clauses 1 to 16.

Unless otherwise stated, the terms "include" and "comprise" (and variations thereof such as "including", "includes", "comprising", "comprises", "comprised" and the like) are used inclusively and do not exclude further features, components, integers, steps, or elements.

Although the present disclosure uses terms "first," "second," etc. to describe various elements, these terms are used only to distinguish elements from one another and not in an ordinal sense. For example, a first candidate pixel could be termed a second candidate pixel or vice versa without departing from the scope of the described examples. Furthermore, when used to differentiate elements or features, a second feature could exist without a first feature. For example, a second candidate pixel could be selected/considered before a first candidate pixel (or without a first candidate pixel ever being selected/considered).

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

The invention claimed is:

1. A computer implemented method including:
   accessing input image data defining a plurality of input pixels of an input image; and
   processing the input image data to generate an output image, the output image defined by output image data, the output image data defining a plurality of output pixels, wherein each output pixel corresponds to an input pixel and at least one output pixel is generated by a sampling process that includes:
     selecting a first working pixel from the plurality of input pixels;
     selecting a first set of sample pixels, wherein the first set of sample pixels includes at least two of the plurality of input pixels; and
     generating a first output pixel that corresponds to the first working pixel based on the first set of sample pixels,
   wherein selecting the first set of sample pixels includes:
     selecting a first candidate pixel from the plurality of input pixels;
     determining a first depth separation between the first working pixel and the first candidate pixel, wherein the first depth separation is determined based on depth data that is associated with the input image and the depth data provides a first working pixel depth and a first candidate pixel depth;
     determining a first depth-adjusted sampling area for the first candidate pixel based on the first depth separation;
     determining that the first candidate pixel is positioned within the first depth-adjusted sampling area; and
     in response to determining that the first candidate pixel is positioned within the first depth-adjusted sampling area, selecting the first candidate pixel for inclusion in the first set of sample pixels for the first working pixel.

2. The computer implemented method of claim 1, wherein selecting the first set of sample pixels includes:
   determining a first set of candidate pixels for the first working pixel, each candidate pixel in the first set of candidate pixels being an input pixel; and
   selecting the first candidate pixel from the first set of candidate pixels.

3. The computer implemented method according to claim 1, wherein generating the first output pixel includes averaging the sample pixels in the first set of sample pixels.

4. The computer implemented method according to claim 1, wherein processing the input image data to generate the output image data includes generating an output pixel corresponding to each input pixel.

5. The computer implemented method according to claim 1, wherein each output pixel is generated according to the sampling process.

6. The computer implemented method of claim 1, further including one or more of: displaying the output image on a display; saving the output image to non-transient memory; printing the output image on a printed product.

7. The computer implemented method of claim 2, wherein determining the first depth-adjusted sampling area is further based on a sampling area scaling factor.

8. The computer implemented method of claim 2, wherein selecting the first set of sample pixels further includes:
   selecting a second candidate pixel from the plurality of input pixels;
   determining a second depth separation between the first working pixel and the second candidate pixel, wherein the second depth separation is determined based on the depth data and the depth data provides a second candidate pixel depth;
   determining a second depth-adjusted sampling area for the second candidate pixel based on the second depth separation;

determining that the second candidate pixel is not positioned within the second depth-adjusted sampling area; and in response to determining that the second candidate pixel is not positioned within the second depth-adjusted sampling area, not selecting the second candidate pixel for inclusion in the first set of sample pixels for the first working pixel, and wherein:

the first candidate pixel and the second candidate pixel are a same two-dimensional distance from the first working pixel;

the first depth separation is different to the second depth separation; and a size of the first depth-adjusted sampling area is different to a size of the second depth-adjusted sampling area.

9. The computer implemented method of claim 2, wherein determining the first set of candidate pixels for the first working pixel includes:

determining a maximum sampling area for the first working pixel; and selecting input pixels from within the maximum sampling area for inclusion in the first set of candidate pixels.

10. The computer implemented method of claim 9, wherein the maximum sampling area for the first working pixel is determined based on a focal depth and a depth of the first working pixel.

11. The computer implemented method of claim 9, wherein the maximum sampling area for the first working pixel is determined based on a blur scaling factor.

12. The computer implemented method of claim 9, wherein the maximum sampling area for the first working pixel is defined by a maximum separation distance.

13. The computer implemented method of claim 9, wherein determining the first set of candidate pixels includes selecting a subset of input pixels that fall within the maximum sampling area for inclusion in the first set of candidate pixels.

14. The computer implemented method of claim 13, wherein selecting the subset of input pixels that fall within the maximum sampling area for inclusion in the first set of candidate pixels includes randomly selecting input pixels that fall within the maximum sampling area.

15. A computer processing system including:

one or more processing units; and a non-transient computer-readable storage medium storing instructions, which when executed by the processing unit, cause the one or more processing units to perform a method including:

accessing input image data defining a plurality of input pixels of an input image; and processing the input image data to generate an output image, the output image defined by output image data, the output image data defining a plurality of output pixels, wherein each output pixel corresponds to an input pixel and at least one output pixel is generated by a sampling process that includes:

selecting a first working pixel from the plurality of input pixels;

selecting a first set of sample pixels; and generating a first output pixel that corresponds to the first working pixel based on the first set of sample pixel, wherein selecting the first set of sample pixels includes:

selecting a first candidate pixel from the plurality of input pixels;

determining a first depth separation between the first working pixel and the first candidate pixel, wherein the first depth separation is determined based on depth data that is associated with the input image and the depth data provides a first working pixel depth and a first candidate pixel depth;

determining a first depth-adjusted sampling area for the first candidate pixel based on the first depth separation; and in response to determining that the first candidate pixel is positioned within the first depth-adjusted sampling area, selecting the first candidate pixel for inclusion in the first set of sample pixels for the first working pixel.

16. The computer processing system of claim 15, wherein selecting the first set of sample pixels includes:

determining a first set of candidate pixels for the first working pixel, each candidate pixel in the first set of candidate pixels being an input pixel; and selecting the first candidate pixel from the first set of candidate pixels.

17. The computer processing system according to claim 15, wherein generating the first output pixel includes averaging the sample pixels in the first set of sample pixels.

18. The computer processing system of claim 16, wherein selecting the first set of sample pixels further includes:

selecting a second candidate pixel from the plurality of input pixels;

determining a second depth separation between the first working pixel and the second candidate pixel, wherein the second depth separation is determined based on the depth data and the depth data provides a second candidate pixel depth;

determining a second depth-adjusted sampling area for the second candidate pixel based on the second depth separation;

determining that the second candidate pixel is not positioned within the second depth-adjusted sampling area; and in response to determining that the second candidate pixel is not positioned within the second depth-adjusted sampling area, not selecting the second candidate pixel for inclusion in the first set of sample pixels for the first working pixel, and wherein:

the first candidate pixel and the second candidate pixel are a same two-dimensional distance from the first working pixel;

the first depth separation is different to the second depth separation; and a size of the first depth-adjusted sampling area is different to a size of the second depth-adjusted sampling area.

19. The computer processing system of claim 16, wherein determining the first set of candidate pixels for the first working pixel includes:

determining a maximum sampling area for the first working pixel; and selecting input pixels from within the maximum sampling area for inclusion in the first set of candidate pixels.

20. A non-transient storage medium storing instructions executable by one or more processing units to cause the one or more processing units to perform a method including:

accessing input image data defining a plurality of input pixels of an input image; and processing the input image data to generate an output image, the output image defined by output image data, the output image data defining a plurality of output pixels, wherein each output pixel corresponds to an input pixel and at least one output pixel is generated by a sampling process that includes:
selecting a first working pixel from the plurality of input pixels;
selecting a first set of sample pixels; and
generating a first output pixel that corresponds to the first working pixel based on the first set of sample pixels,
wherein selecting the first set of sample pixels includes:
selecting a first candidate pixel from the plurality of input pixels;
determining a first depth separation between the first working pixel and the first candidate pixel, wherein the first depth separation is determined based on depth data that is associated with the input image and the depth data provides a first working pixel depth and a first candidate pixel depth;
determining a first depth-adjusted sampling area for the first candidate pixel based on the first depth separation;
determining that the first candidate pixel is not positioned within the first depth-adjusted sampling area; and
in response to determining that the first candidate pixel is positioned within the first depth-adjusted sampling area, selecting the first candidate pixel for inclusion in the first set of sample pixels for the first working pixel.

* * * * *